Patented Dec. 1, 1936

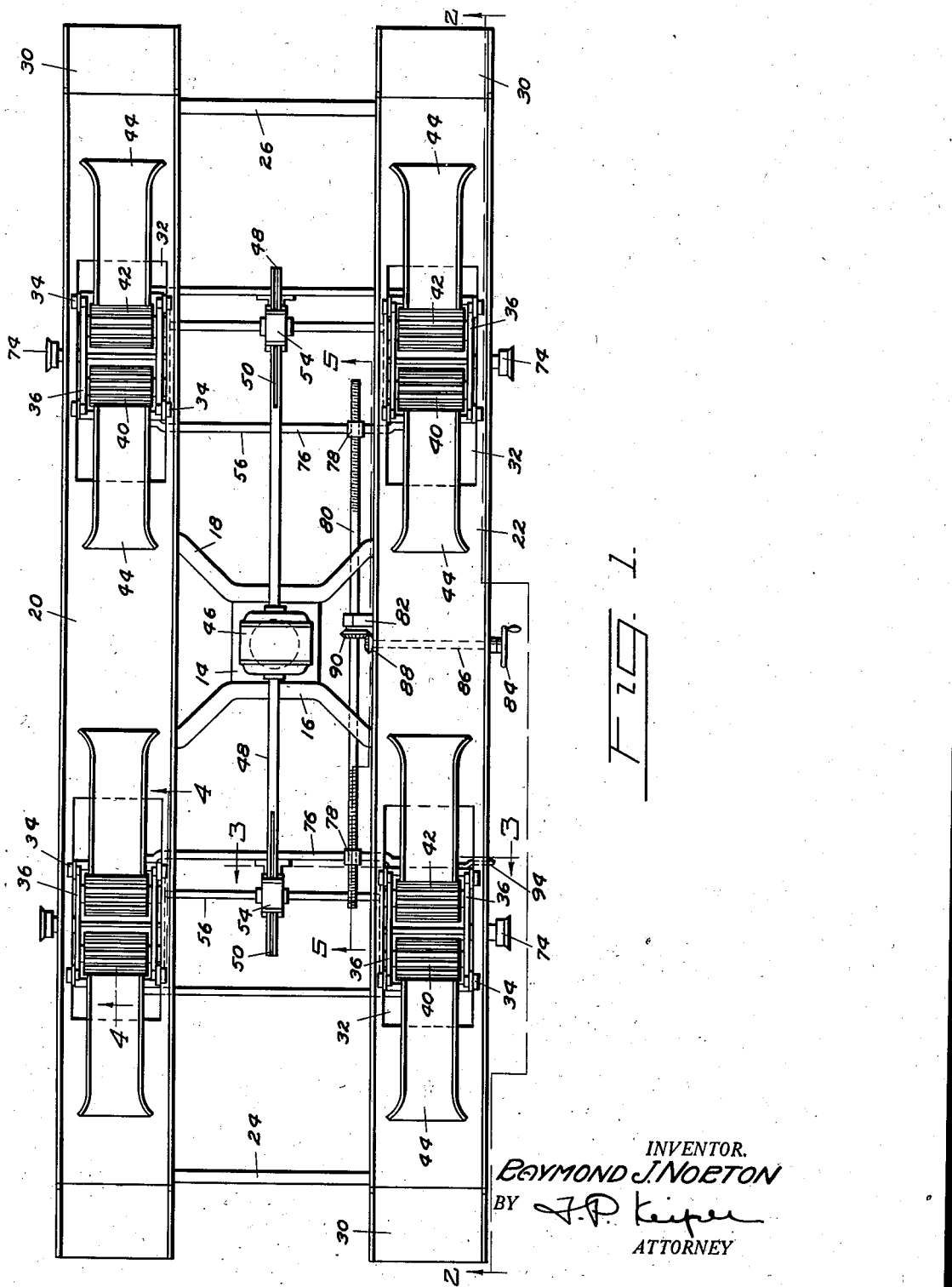

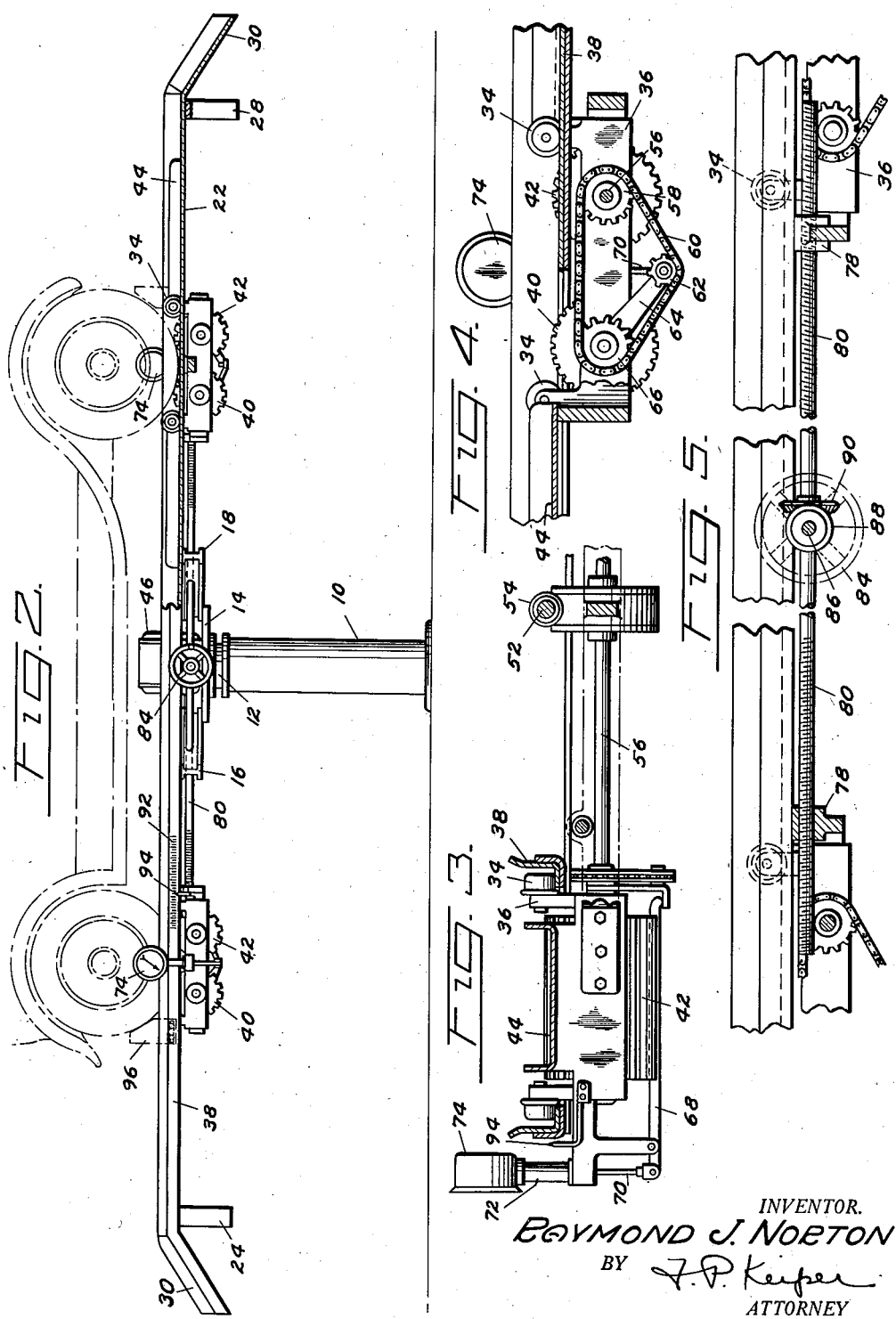

2,062,600

UNITED STATES PATENT OFFICE 2,062,600

SERVICE APPARATUS

Raymond J. Norton, Washington, D. C., assignor to Bendix Aviation Corporation, South Bend, Ind., a corporation of Delaware Application March 14, 1934, Serial No. 715,552

5 Claims. (Cl. 73—51)

This invention relates in general to the testing of vehicle brakes and more particularly has reference to the indication of retardation or braking effects as measured by brake testing apparatus.

At present, vehicle brakes may be tested by various devices in which mechanical, hydraulic, or electrical dynamometers are incorporated. These devices generally consist of a source of power adapted to rotate a vehicle wheel against the resistance of its brake and mechanism for measuring and indicating the brake retardation. Such of these devices that are adapted to test the brakes of the four wheels of a vehicle occupy a large floor space, as they must be necessarily larger than the wheel base of the largest vehicle it is designed to test.

Another device of similar size which has become practically a necessity in a well-appointed garage or service station is the hydraulic lift, the advantages of which over the previously used pits in the way of easy access to the parts of the vehicle, safety, and cleanliness are too well known to require extended comment.

It often happens, however, that a garage or service station where space is limited must choose between these two valuable devices, with the result that it must do without one or the other. One purpose of my invention, accordingly, is to provide in my service apparatus the valuable features of both these useful devices.

By such a combination, it will be apparent that a saving of time as well as space will be effected. Where a vehicle is to be completely serviced, it will not be necessary to drive it first on one device and then upon another, but it may be driven upon my apparatus, where the various service operations may be performed. Besides the economic saving effected by the saving of time and space, a saving in cost is effected since the combining of these features in one device obviates the duplication of parts which would be necessary in two separate devices.

My service apparatus is particularly valuable as a brake tester because of the fact that the vehicle can be raised and rotated so that observation and adjustment of the brakes while they are being tested may be more easily accomplished.

With these and other objects in view, which will appear as incident to my invention from the description thereof, my invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood I have shown in the accompanying drawings means for carrying the same into practical effect, without limiting the improvements in their useful applications to the particular constructions, which, for the purpose of explanation, have been made the subject of illustration.

In the drawings:

Figure 1 is a plan view of a service apparatus constructed in accordance with the present invention;

Figure 2 is a side elevation, partly in section, along the line 2—2 of Figure 1;

Figure 3 is a sectional view taken on line 3—3 of Figure 1;

Figure 4 is a sectional view taken on line 4—4 of Figure 1;

Figure 5 is a sectional view taken on the line 5—5 of Figure 1.

Referring to the drawings, in which similar reference numerals indicate similar parts throughout the several views thereof, there is shown a piston 10, operable by the usual hydraulic means (not shown) to raise or lower the device as a whole. Mounted at the end of the piston 10 for rotation about the axis thereof is a supporting member 12, upon which is mounted a supporting table 14. Symmetrically mounted on the supporting table are the I-beams 16 and 18, which support the channel members 20 and 22. Connecting the ends of the channel members 20 and 22 are braces 24 and 26, bent down at their ends to form standards 28.

It will be appreciated that the parts so far described constitute a hydraulic lift. Various other methods of rotatably supporting the channel members upon the central piston will be apparent to those skilled in the art, without departing from the spirit of the present invention. The vertical sides of the channel members act as protective guides for a vehicle driven upon them, as well as strengthening members. If desired, the sides of the channels may be tapered to provide greater height at the parts of the channels under greatest bending stress. At the ends of the channels are provided the ramps 30.

It will be noted that the bottoms of the channel members are slotted as indicated at 32 to provide for adjustably mounting brake tester units therein. If desired, only two such movable brake testing units may be used, corresponding to the wheels on one axle of a vehicle, in which case the remaining two units may be mounted in a permanent position. Such an arrangement would also permit the use of self-adjusting units such as are shown in the application of Harry H. Semmes, Serial No. 360,100, filed May 3, 1929. I prefer the form illustrated, however, because symmetrical loading on the piston may be assured.

The brake testing units are supported in the slots 32 by flanged rollers 34 mounted on frames 36 of the brake tester units. The frames are suspended from the rollers and the rollers are adapted to ride upon the edges defining the slots 32, which may be reinforced, as at 38. Also supported by the frames 36 are the corrugated rolls 40 and 42, adapted to drive the wheels of the vehicle to be tested. The peripheries of these rollers are slightly above the faces of the channel members. One of the rolls of each set, 42, is an idler, while the other, 40, is a driven roll. Protective guides 44 are fastened to the frames 36 to bridge over the openings 32.

A driving motor 46, mounted on the supporting table, provides power for the brake testing units in the preferred embodiment, although a separate motor for each unit may be used. Electric power may be delivered to the motor through flexible connections, or through connections within the piston. The motor may also be used to drive a pump to actuate the hydraulic lift.

The armature shaft 48 of the motor extends from both sides of the motor, and is splined at its ends as indicated at 50. Slidably mounted upon these splined portions are worms 52 mounted in housings 54, and cooperating with worm wheels on cross shafts 56. Shafts 56, adjacent their ends which are mounted in the frames 36, are provided with the driving gears 58. An endless chain 60 passes over gear 58, an idler 62 mounted on an arm 64, and driven gear 66 connected to the roll 40.

The force with which the motor drives a driven roll 40 causes the chain 60 to lift the idler 62. The idler arm 64 is connected through lever 68 to a rod 70 connected to a piston within a cylinder 72 containing liquid, and the pressure of such liquid is indicated on an indicator 74. Such indications may be calibrated to indicate the force required to turn the wheel of the vehicle against its braking resistance. If desired, other suitable force indicating means may be used. The indicators, if preferred, may all be located at a central point.

To insure the braking units for one axle moving together, cross braces 76 are provided, which are attached to the frames 36 and the casing 54. Threaded recesses 78 in cross braces 76 cooperate with threads on shaft 80. Shaft 80 is centrally supported by a bracket 82 on channel member 22, and may be rotated by a hand wheel 84 connected to said shaft by shaft 86 and gears 88 and 90.

By rotating the hand wheel 84, the brake tester units are brought together or spread apart, to accommodate vehicles of different length. By the concurrent movement of all of the units, it will be appreciated that a symmetrical loading on piston 10 is possible. The units may be placed equidistant from the center, or one set may be given a slight lead over the other. A scale 92 provided on the side of channel 22 and cooperating with a pointer 94 attached to the adjacent frame 36, may be calibrated to indicate the length of wheel base for which the brake tester units are set, and used to set the units the proper distance apart before the vehicle is driven upon the device. Removable chock blocks 96 may be used to hold the vehicle on the apparatus.

The brake tester units are of any suitable type. Clutches may similarly be provided in the driving connections to the units to permit independent testing of each wheel.

In operation, the units are adjusted by scale 92, for the vehicle to be tested and serviced, and the vehicle is driven on the device. While the brakes may be tested while the device is on the ground, and the vehicle afterwards raised to an elevated position for service operations, it is preferred to raise the vehicle and test the brakes while the vehicle is elevated. In its elevated position, in which position it is free to rotate in a horizontal plane, easy access may be had to the wheels and brakes for observation and adjustment. At the same time, other service operations may be carried out. Other operations will be apparent from the description.

While I have shown and described the preferred embodiment of my invention, I wish it to be understood that I do not confine myself to the precise details of the construction herein set forth, by way of illustration, as it is apparent that many changes and variations may be made therein by those skilled in the art, without departing from the spirit of the invention, or exceeding the scope of the appended claims.

Disclosure of this application corresponds to my prior application Serial No. 509,506, filed January 17, 1931, for Service apparatus.

Having thus described the various features of the invention, what I claim as new and desire to secure by Letters Patent is:

1. In a service apparatus, a runway of channel cross section, the flanges thereof being upturned and acting as guard rails, an elongated rectangular aperture in the web or tread of the runway, said aperture being less wide than the tread, a brake testing unit adapted to be placed in the aperture, said brake testing unit comprising tread rollers mounted in a carriage, rollers on the carriage adapted to run on the tread of said runway adjacent the aperture, said brake testing unit being suspended through and below the runway, a short runway member attached to the carriage on either end thereof and bridging the opening and means for adjusting the unit in the aperture.

2. A service apparatus comprising a frame including parallel runways having spaced openings, four brake testing units mounted for travel on the runways each unit suspended in an opening, members attached to the units bridging the openings, means on the frame for simultaneously adjusting the units symmetrically on said runways, and means for indicating the relative positions of the units.

3. A service apparatus comprising a frame including parallel runways each having spaced openings, four brake testing units mounted for travel on the runways, each unit being suspended from a runway in an opening thereof, and members attached to the units bridging the openings.

4. A service apparatus comprising a frame including parallel runways having spaced openings, a plurality of brake testing units mounted for travel on the runways, each unit suspended from a runway in an opening, and members attached to each unit for bridging its respective opening.

5. In a service apparatus, a runway, an elongated aperture in the tread of the runway, said aperture being less wide than the tread, a brake testing unit adapted to be placed in the aperture, said brake testing unit mounted in a carriage, means on the carriage adapted to support the carriage from the tread of said runway adjacent the aperture, said brake testing unit being suspended through and below the runway, a short runway member attached to the carriage on either end thereof and bridging the opening.

RAYMOND J. NORTON.